(12) United States Patent
Böhm

(10) Patent No.: US 6,453,735 B1
(45) Date of Patent: *Sep. 24, 2002

(54) EXTERNALLY CONTROLLABLE REGULATED BRAKE-BOOSTER AND OPERATING METHOD THEREFOR

(75) Inventor: Jürgen Böhm, Oberneisen (DE)

(73) Assignee: ITT Manufacturing Enterprises, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,489
(22) PCT Filed: Mar. 23, 1996
(86) PCT No.: PCT/EP96/01293
§ 371 (c)(1), (2), (4) Date: Nov. 24, 1997
(87) PCT Pub. No.: WO96/30246
PCT Pub. Date: Oct. 3, 1996

(30) Foreign Application Priority Data

Mar. 31, 1995 (DE) .......................................... 195 11 845

(51) Int. Cl.$^7$ .............................................. G01M 15/00
(52) U.S. Cl. ...................................................... 73/129
(58) Field of Search ........................ 73/121, 129; 701/1, 701/70; 340/438, 453

(56) References Cited

U.S. PATENT DOCUMENTS

| | | | | | |
|---|---|---|---|---|---|
| 4,573,350 | A | * | 3/1986 | Anderson | 73/129 |
| 4,824,182 | A | * | 4/1989 | Steffes et al. | 73/121 |
| 5,531,509 | A | * | 7/1996 | Kellner et al. | 303/114.1 |
| 5,605,088 | A | * | 2/1997 | Balz et al. | 91/369.1 |
| 5,611,257 | A | * | 3/1997 | Eick | 91/367 |
| 5,705,744 | A | * | 1/1998 | Brugger et al. | 73/121 |

FOREIGN PATENT DOCUMENTS

| | | |
|---|---|---|
| DE | 40 34 847 | 5/1992 |
| DE | 43 24 688 | 1/1995 |

* cited by examiner

Primary Examiner—Eric S. McCall
(74) Attorney, Agent, or Firm—Rader, Fishman & Grauer PLLC

(57) ABSTRACT

A controlled brake booster that may have an external trigger is provided. The brake booster includes a control circuit, an electromagnet positioned within the control circuit that activates the brake booster, a superordinated function unit and at least one signal processing device for determining a parameter that is related to the temperature of the electromagnet from values processed in the control circuit. Nominal value for the electromagnet, in the form of a mathematical model, and actual values pertaining to the electromagnet are processed in the control circuit. A preferred embodiment of the booster utilizes internal magnetic signals without requiring special temperature sensory equipment.

14 Claims, 3 Drawing Sheets

EXTERNALLY CONTROLLABLE REGULATED BRAKE-BOOSTER AND OPERATING METHOD THEREFOR

BACKGROUND OF THE INVENTION

The present invention relates to a controlled, externally operable brake booster, which can be activated by means of an electromagnet which is, for its part, positioned within a control circuit, the nominal value of which is preset by a superordinated control unit, as well as process for the operation of the same.

Such a type of controlled, externally operable brake booster is already known, for example, from DE 43 24 688. The electromagnet in this is seated centrally within the control casing of the brake booster. During an externally-triggered operation of the brake booster, the electromagnet is nearly permanently live. This leads to a heating of the electromagnet which becomes evident, above a certain critical range, in the form of lower power. In extreme cases, this can result in the fact that the power of the electromagnet is no longer sufficient to activate the brake booster. Since the electromagnet is positioned at a central point within the control casing of the brake booster, a sufficient cooling of the electromagnet is either not possible, or only at very high expense. The placing of an additional temperature sensor is, for reasons of space and cost, little advantageous.

It is the object of the present invention to propose measures which make a monitoring of the magnet temperature possible, without requiring an additional temperature sensory equipment for the same.

SUMMARY OF THE INVENTION

In accordance with the invention, means are provided which determine, from the nominal and/or the actual values of the control circuit, a quantity (parameter) which is proportional to the average temperature of the electromagnet. This has the advantage that no special temperature sensors are necessary. The parameter can be determined during a control process by means of the nominal or actual values of the control circuit which are present in any event and be processed.

The parameter is preferably stored in a signal processing unit and passed along to a monitoring unit. On the basis of the nominal and/or actual values of the control circuit, the signal process unit carries out a parameter estimation. The monitoring unit reports an error function to a superordinated function unit, which can then, for example, cut off the adjustment or the control, issue a warning indication, or react in a similar, predetermined manner.

It is provided, furthermore, to check the input values and/or the estimated parameters for their plausibility and to only pass along the parameters if the plausibility test turns out to be positive. If the estimated parameter is outside of a specific, theoretically possible range, or if the nominal or actual values which are processed by the signal processing unit move outside of a range in which a reasonable estimate is to be expected, then a negative plausibility testing signal is passed along to the release unit. This can either pass the last determined value which has been found to be plausible along to the monitoring unit, issue an error function report, or react in some other manner. The actual values of the current and the voltage of the electromagnet, as well as the travel of the armature of the electromagnet, are preferably processed, which guarantees a high precision of the next-following estimate, since the actual values of the current and voltage are, in particular, correlated relatively strongly with the temperature of the electromagnet.

One additional advantageous possibility consists of applying the nominal and actual values of the currents of the electromagnet for the estimate. This is possible if the electromagnet is controlled by a current control unit and makes it possible to carry out the estimate with simple means.

The parameters $\hat{\Theta}$ for the static and dynamic behavior of the current control circuit are thereby estimated. Conclusions about the average temperature $\theta$ of the electromagnet can be drawn on the basis of these parameters (static amplification factor becoming slighter, dynamics tapering off).

The nominal and/or the actual values are preferably scanned in short, equidistant intervals of time. The estimate is carried out by means of a mathematical parametric model of the electromagnet, which is deposited in the signal processing unit and makes possible a correlation between the nominal and/or the actual values and the physical parameters of the electromagnet. The parameter can thereby be either the temperature or another temperature-dependent quantity, such as a temperature-dependent resistance, for example.

The process in accordance with the invention can be used both for the operation of a controlled, externally-triggered [braking] booster as well as, in general, for the monitoring of the temperature of an electromagnet which is controlled in a position-proportional manner. It offers the advantage that nominal and/or actual values which are present in any event are used without being meshed into the control process in a disruptive manner. Defined static measuring conditions are not necessary. A parameter, an average resistance, or an average temperature can be estimated here, too, by means of a mathematically parameterized model of the electromagnet.

Further advantages of the invention proceed from the following description by means of two examples.

DETAILED DESCRIPTION OF THE INVENTION

Figure 1:
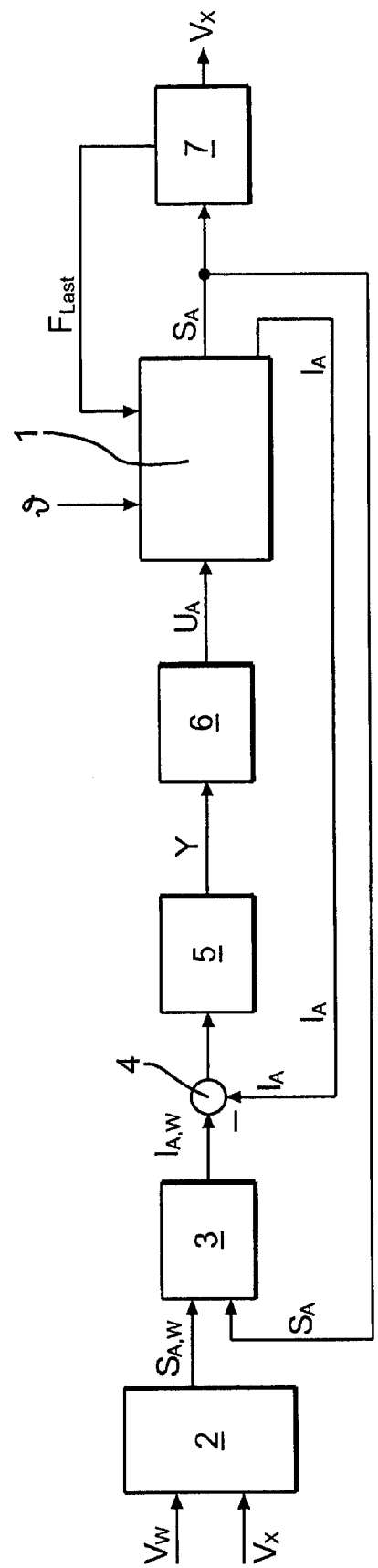
FIG. 1 shows a proportional positional control of an electromagnet.

One example of a proportional positional control of an electromagnet 1 is depicted in a schematic diagram in FIG. 1. A superordinated function unit 2 which can be both a part of a control circuit as well as of a control unit, passes an armature travel nominal value $S_{A,W}$ along to a positional control unit 3 of the electromagnet 1. This determines, from a comparison with the armature travel actual value $S_A$, a current nominal value $I_{A,W}$ from which the current actual value $I_A$ is subtracted in an adding device, and the difference which results is conveyed to a current control unit 5. Its output signal Y is amplified in an amplifier 6 and passed along, as an armature voltage $U_A$, to the electromagnet 1. An armature travel actual value $S_A$ and a current actual value $I_A$ are thereby set. The armature (with the armature travel actual value $S_A$) acts upon a brake booster 7, whereby a reaction force $F_{Load}$) acts retroactively on the electromagnet 1 as a disturbance variable. An additional disturbance variable is the temperature which is acting upon on the electromagnet 1.

The activation of the brake booster 7 brings it about that a motor vehicle deceleration $V_x$ is set which should lie as close as possible to the desired deceleration $V_w$ which has been preset by the superordinated function unit 2.

Examples of implementation of a corresponding brake booster 7 with an integrated electromagnet 1 may be inferred from the DE 43 24 688.

The following is applicable for the temporal course of the voltage applied to the electromagnet 1:

$$U_A(t) = R \cdot I_A(t) + \frac{d}{dt}(L(S_A(t)) \cdot I_A(t))$$

It can be recognized that a determination of the coil resistance R which is dependent upon the average temperature of the electromagnet can only take place, under static conditions, in accordance with Ohm's Law; that is to say: Inductance L=const., armature travel $S_A$=const., and current $I_A$=const.

During a proportional position control of the electromagnet 1, no determination of the electrical resistance R of the electromagnet 1 by means of Ohm's Law is thus possible, since a continuous activation and triggering of the electromagnet 1 with varying values takes place by means of the control.

The permanent provision of current to the electromagnet 1 leads, in addition, to a more or less significant increase in the temperature, which can lead to the impairment of the function, to an error function, or, in the event of continuously exceeding a critical temperature, even to a destruction of the electromagnet 1. Since, as has been described above, the electrical resistance can not be measured during a control process, the temperature dependence $R(\theta)$ can not be utilized here.

If the time derivation of the above-stated equation is carried out, then the following results:

$$U_A(t) = R \cdot I_A(t) + L(S_A(t)) \cdot \dot{I}_A(t) + I_A(t) \cdot \frac{d}{dS}L(S_A(t)) \cdot \dot{S}_A(t)$$

Here, the values $U_A$, $I_A$ and $S_A$ can be measured directly. The time derivations $\dot{I}_A$ and $\dot{S}_A$ can be determined from the temporal course of $I_A$ and $S_A$ by means of differentiation. The electrical resistance R and the inductance $L(S_A(t))$ which are being sought, as well as their derivations in accordance with $S_A$, remain unknown. It is provided, in accordance with the invention, to assume a model pattern for $LS_A(t)$). The coil resistance R can consequently be determined or estimated on the basis of the voltage and current measurements, during the active position-proportional control of the electromagnet. This is depicted in FIG. 2.

During the operation of the electromagnet 1 controlled in a position-proportional manner, the magnet signals $S_A$ and $I_A$ are measured at equidistant intervals of time, and are evaluated by a signal processing unit 8. The signal processing unit estimates the temperature-dependent resistance of the magnetic coil on the basis of the signals which are measured. The basis for this consists of the mathematical parametric model for the electrical partial system of the electromagnet 1, as has been described above. This model describes, such as in the form of a differential equation, for example, the connection between the process measuring signals, with sufficient accuracy, and consequently makes possible a correlation between the signals $I_A$, $S_A$, $U_A$ and the physical parameters of the electrical partial system. The coil resistance is one of these parameters.

The signal processing unit 8 determines, on the basis of the magnet signals $I_A$, $S_A$, $U_A$ which are measured, an estimated value $\hat{R}(\theta)$ for the current coil resistance, through the minimization of an effectiveness criterion which is generally quadratic. In this, a good knowledge of the remaining model parameter, such as of the position-dependent coil inductance, such as $L(S_A(t))$, for example, is not urgently necessary. The validity of the estimated value $\hat{R}(\theta)$, and thereby the approval for the temperature monitoring, is determined by means of a plausibility test, which is carried out in the plausibility examination unit 9. If the plausibility examination unit 9 determines that the estimation provides valid values, then it further reports this to the release unit 10, which thereupon passes the estimated value $\hat{R}[\theta]$ along to the temperature monitoring unit 11. This determines, on the basis of the valid resistance values $\hat{R}[\theta]$, whether the average temperature of the electromagnet is still located within a permissible range, and indicates a corresponding status report to the superordinated function unit 2. Characteristic curves $R[\theta]$ determined from preliminary examinations are used for the monitoring. One possibility for the evaluation consists of the fact that, as soon as the estimated resistance $\hat{R}$ is, for the first time, or for the duration of a previously defined observation period, above the previously defined limit resistance $R_{Limit}=R(\theta_{Limit})$, then this is considered to be a sign that a reliable and secure function of the electromagnet 1 can no longer be guaranteed. A corresponding status report takes place on the superordinated function unit 2.

Figure 2:
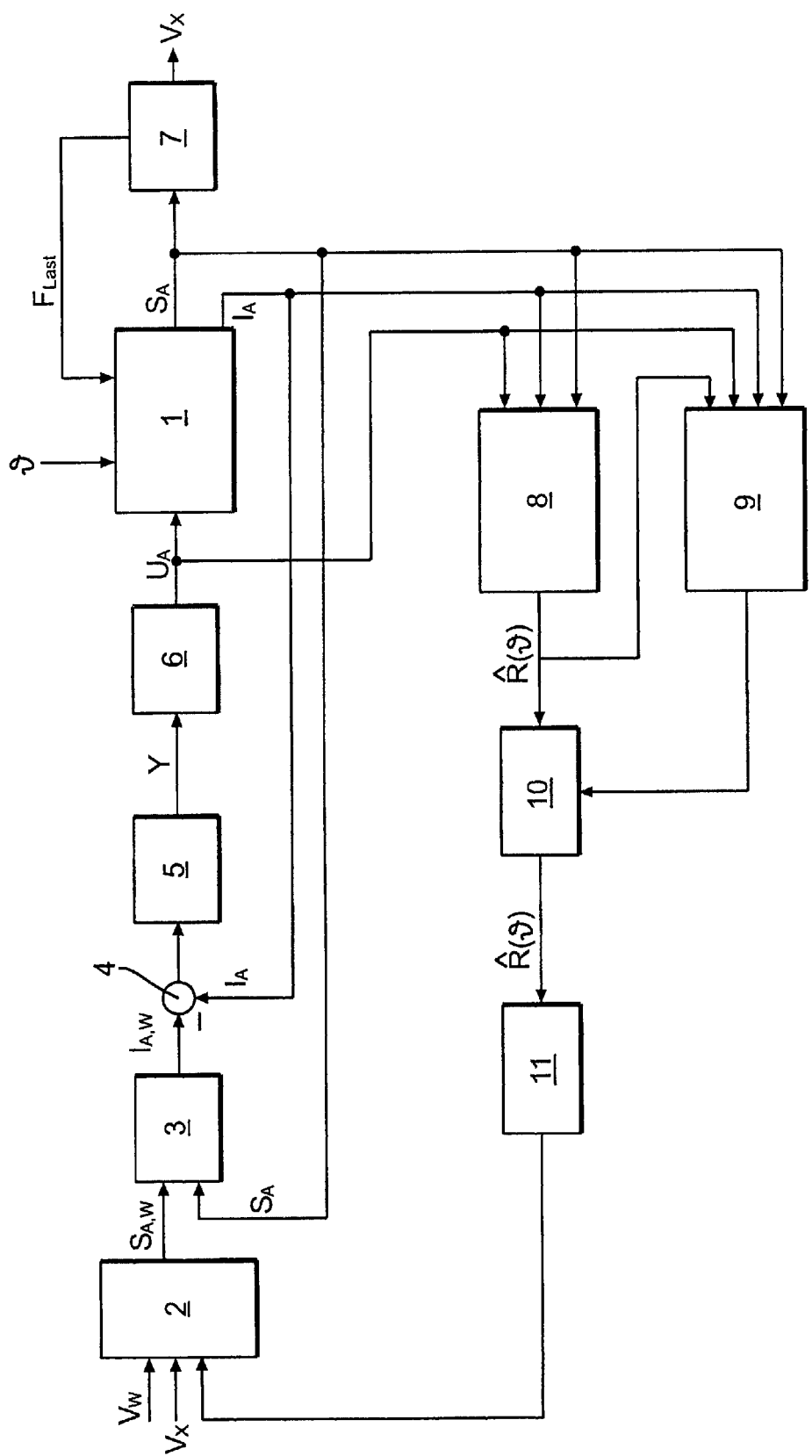
FIG. 2 shows a first example of implementation in accordance with the invention.

The example of implementation in accordance with FIG. 2 has the advantage that no special temperature sensory equipment is necessary, but only internal magnetic signals are used. A continuous estimation of the resistance or of the temperature is, in particular, also possible with an active position-proportional control of the electromagnet 1, but a determination of further model parameters in addition to the resistance R is not urgently necessary.

Figure 3:
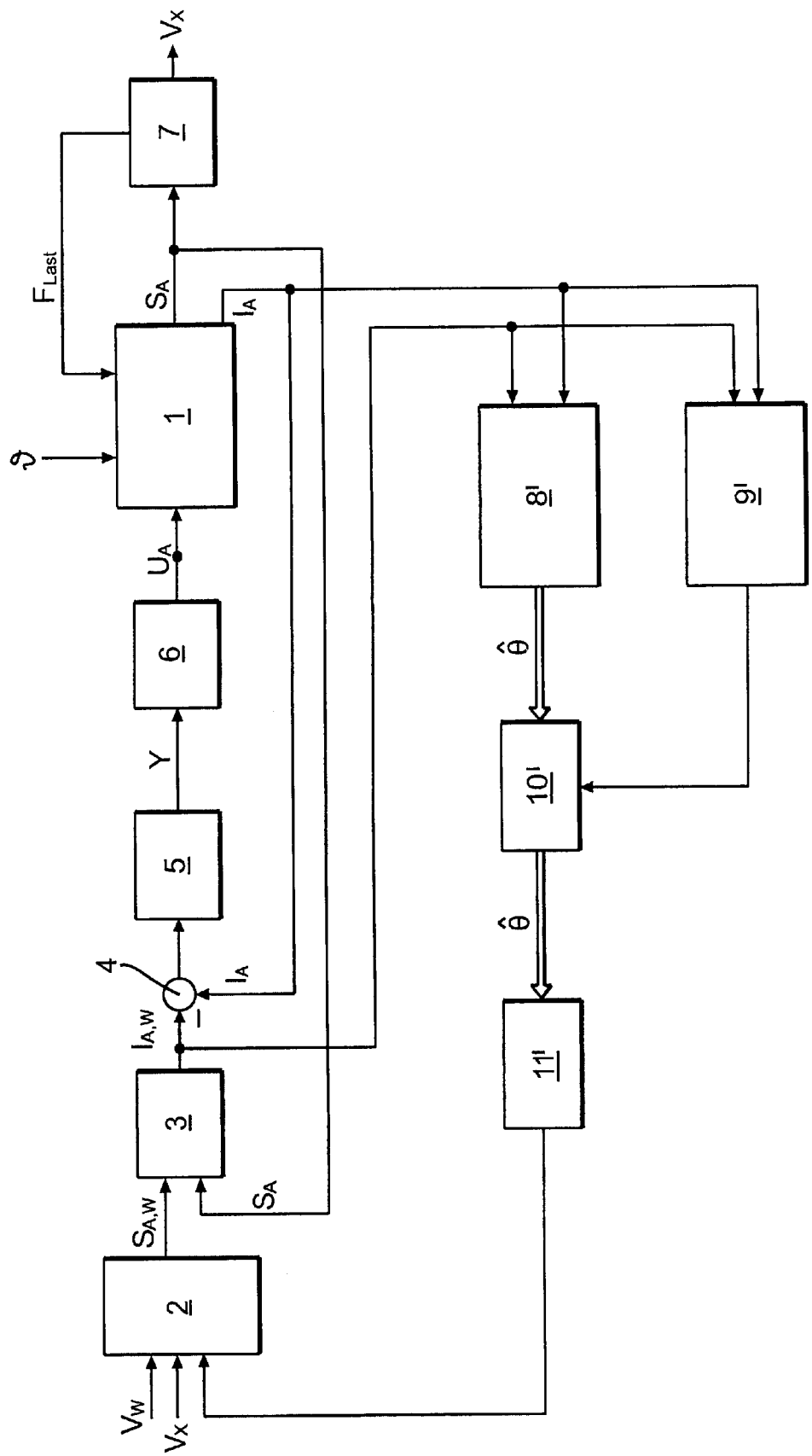
FIG. 3 shows a second example of implementation in accordance with the invention.

One additional possibility for the monitoring of the temperature, which can be implemented particularly well if the active position-proportional control of the electromagnet 1 is carried out by means of a current control circuit 3, 5, 6, 1, is indicated in FIG. 3. In this, the measurement of the current nominal value $I_{A,W}$ and of the current actual value $I_A$ is only necessary at equidistant intervals of time. Use is hereby made of the fact that the maximum armature voltage $U_{A,max}$ for the electromagnet 1 is limited by the on-board voltage $U_{max}$ of the motor vehicle. In the normal case—that is to say, if the temperature $\theta$ of the electromagnet is within the permissible temperature range—then the current actual value $I_A$, in accordance with a deceleration behavior, follows the current nominal value $I_{A,W}$. The static amplification factor of the current control circuit 3, 5; 6, 1 is approximately one.

If the temperature $\theta$ of the electromagnet 1 increases, then, because of the increase of the resistance R which is connected with the same, a greater voltage $U_A$ is necessary in order to adjust the preset nominal current $I_{A,W}$. Since the voltage $U_A$ is limited at the top by the on-board voltage $U_{max}$, the maximum adjustable current $I_A$ decreases with increasing coil resistance R. If the required current nominal value $I_{A,W}$, as a correcting variable of the superordinated position control unit 3, is above the maximum current, then the controlled quantity $I_A$ can no longer follow the preset nominal current $I_{A,W}$ (control input). This can be understood as a change of the static and dynamic behavior of the current control circuit 5, 6, 1. The determination of the parameters of the control circuit considered is carried out, by means of the measuring signals which have been noted above, through the minimization of an effectiveness criterion which is, in general, quadratic. The basis for this is, in turn, a mathematical parametric model, in the form of differential equations, for example, which describes the static and dynamic behavior of the current control circuit (connection between nominal current and actual current) with sufficient accuracy.

It can be determined, by means of the change of parameters, whether the current control circuit 5, 6, 1 is still working in an orderly manner, or whether an error function on the basis of an exceeding of the permissible magnet temperature θ is present. The signal processing unit 8' thereby determines an estimate vector Θ of the parameters of the current control circuit which are released by a release unit 10' if a plausibility examination unit 9' issues a positive plausibility signal. A temperature monitoring unit 11' examines, on the basis of the parameters and/or of the temporal behavior of the estimated parameter of the parameter vector $\hat{\Theta}$, whether the current control circuit is still working in an orderly manner or whether, because of an exceeding of the permissible magnet temperature, an error function is present, and passes a corresponding status report along to the superordinated function unit 2.

In this case, too, no special temperature sensory equipment is necessary, if only signals which are internal and relatively easy to measure are used. The function monitoring of the current control circuit in the routine operation does not require any special test signal, and the monitoring is continuously possible.

What is claimed is:

1. A controlled brake booster system, comprising:
    a brake booster;
    a trigger located outside of and coupled to the brake booster to control activation of the brake booster;
    a control circuit for providing an electrical signal to an electromagnet to activate said brake booster in accordance with said trigger; and
    a signal processing unit for monitoring at least one electrical characteristic of said electromagnet, wherein said signal processing unit includes means for determining the temperature of said electromagnet based on a temperature-dependent electrical characteristic of said electromagnet during proportional position control of the said electromagnet, wherein the means for determining the temperature of said electromagnet includes a mathematical parametric model defining an interrelationship between a nominal current and an actual current said of electromagnet.

2. A brake booster in accordance with claim 1, wherein the signal processing unit monitors an electrical current and a voltage provided to the electromagnet and an actual armature travel value of the electromagnet as said at least one electrical characteristic of said electromagnet.

3. A brake booster in accordance with claim 1, wherein the signal processing unit monitors an actual current and a nominal current signal, which are used to determine the electrical signal provided to the electromagnet.

4. The brake booster in accordance with claim 1, wherein the means for determining the temperature determines whether the temperature of the electromagnet is within a selected range based on the temperature-dependent electrical characteristic of the electromagnet.

5. A brake booster system, comprising:
    a brake booster including an electromagnet; and
    a signal processing unit which, during continuous triggering of said electromagnet, monitors the temperature of said electromagnet by determining a temperature dependent characteristic of said electromagnet wherein a mathematical parametric model of said electromagnet is stored in said signal processing unit such that said model estimates the temperature of said electromagnet from an actual current and a nominal current of said electromagnet or from an actual current, an actual armature travel value, and an actual voltage of said electromagnet.

6. The brake booster of claim 5, wherein said signal processing unit determines the temperature dependent characteristic from an actual current, an actual armature travel value, and an actual voltage of said electromagnet.

7. The brake booster of claim 5, wherein said signal processing unit determines the temperature dependent characteristic from an actual current and a nominal current of said electromagnet.

8. The brake booster of claim 5, further including a plausibility examination unit.

9. The brake booster of claim 5, wherein said mathematical parametric model is a first order differential equation of actual current and armature travel.

10. The brake booster of claim 9, wherein said mathematical parametric model is:

$$U_A(t) = R \cdot I_A(t) + L(S_A(t)) \cdot \dot{I}_A(t) + I_A(t) \cdot \frac{d}{dS} L(S_A(t)) \cdot \dot{S}_A(t).$$

11. The process of claim 10, further including examining the plausibility of the estimated temperature-dependent characteristic.

12. The process of claim 10, wherein the estimating step includes using a mathematical parametric model of said electromagnet.

13. The brake booster of claim 5, wherein said mathematical parametric model is a first order differential equation of actual current and armature travel.

14. The process of claim 13, wherein said mathematical parametric model is:

$$U_A(t) = R \cdot I_A(t) + L(S_A(t)) \cdot \dot{I}_A(t) + I_A(t) \cdot \frac{d}{dS} L(S_A(t)) \cdot \dot{S}_A(t).$$

* * * * *